(12) United States Patent
Partel

(10) Patent No.: US 6,636,786 B2
(45) Date of Patent: Oct. 21, 2003

(54) AIRCRAFT ENERGY SYSTEMS MANAGEMENT METHOD

(75) Inventor: Walter V. Partel, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 46 days.

(21) Appl. No.: 10/045,997

(22) Filed: Oct. 18, 2001

(65) Prior Publication Data

US 2003/0078704 A1 Apr. 24, 2003

(51) Int. Cl.[7] .................................................. B64C 1/00
(52) U.S. Cl. .............................. 701/3; 701/14; 244/183; 244/185; 340/945
(58) Field of Search ............................... 701/3, 14, 28; 244/183, 185, 186; 340/945, 961

(56) References Cited

U.S. PATENT DOCUMENTS 4,536,843 A  * 8/1985  Lambregts ..................... 701/3
5,745,114 A    4/1998  King et al. ................... 345/810
6,542,796 B1 * 4/2003  Gibbs et al. ..................... 701/3

* cited by examiner

Primary Examiner—Marthe Y. Marc-Coleman
(74) Attorney, Agent, or Firm—DiPinto & Shimokaji, P.C.

(57) ABSTRACT

An energy systems management method includes steps of providing a hierarchically arranged, interrelated set of synoptic displays interfaced to an energy system for receiving information from and providing command inputs to the energy system. One synoptic display of the set of synoptic displays is an overall energy synoptic, and the other synoptic displays of the set of synoptic displays are synoptics displaying the status of corresponding energy systems. The method also includes steps of acquiring human inputs through the synoptic displays, for example, by means of a computer user interface device, and controlling the energy system by processing the human inputs through the synoptic displays to provide command inputs to the energy system.

19 Claims, 8 Drawing Sheets

AIRCRAFT ENERGY SYSTEMS MANAGEMENT METHOD

BACKGROUND OF THE INVENTION

The present invention generally relates to aircraft system control and indication methods and, more particularly, to a display and control method for the management of aircraft energy systems. In general, aircraft energy systems include fuel, propulsion (engines and auxiliary power unit (APU)), electrical, hydraulic, and bleed air systems.

Flight crews on current commercial and military airplanes obtain information on the state of their main airplane power systems, which includes the fuel, propulsion, electrical, hydraulic, and bleed air systems, through various displays and other information sources including control panel switch positions and lights, alert messages from a centralized crew alerting system display, system synoptic displays, and checklists. The engines combust fuel to convert chemical energy to thrust, enabling flight. But the engines also drive accessory components which create electric, hydraulic, and bleed air energy. These downstream energy sources power the various airplane systems, for example, navigational and interior lighting, flight controls, and cabin environmental control. When an energy source fails, for example, by a main engine failure or an APU failure, or when a component in a downstream energy system fails, for example, by an electrical generator failure or a hydraulic or bleed air pump failure, redundancy is lost and capability may be lost. Flight crews must have a clear understanding of the current state of their power systems to support procedures and support critical mission-level decisions.

The various displays and other information sources for the state of the main airplane power systems, including control panel switch positions and lights, alert message display, system synoptic displays, and checklists, are typically dispersed throughout the cockpit and are not integrated. For example, FIGS. 1A and 1B show overhead panel 100, which is currently used in one model of a commercial airliner. As seen in FIGS. 1A and 1B, certain indications and controls for the engines are located in area 102, while certain indications and controls for fuel are located at area 104. FIGS. 1A and 1B also show that certain indications and controls for the APU, which may typically be a gas turbine engine located in the tail of the aircraft, are located in area 106 along with indications and controls for the electrical system. It is also seen in FIGS. 1A and 1B that certain indications and controls for the hydraulic system are located at area 108, and certain indications and controls for pneumatic systems, including pressurization, bleed air, and air conditioning, are located at area 110.

The status of each system is generally indicated at the detailed component level, such as a hydraulic pump or electrical generator. For example, FIG. 2 shows a display of hydraulic system synoptic 200, which is currently used in one model of a commercial airliner. As seen in FIG. 2, information is provided by system synoptic 200 at the detailed component level, where, for example, pressure indicators 202 indicate pressure available in hydraulic lines 204 produced by primary pumps 205, and hydraulic lines 204 are configured to illustrate which system functions 206, such as left and right thrust reversers 207 and 209, and flaps 211, have available pressure supplied by hydraulic lines 204. Even though the power systems are heavily interdependent, for example, the bleed air system powers the hydraulic pumps, the electrical system powers the engine fuel pumps, and so forth, each system is separately displayed. For example, FIG. 2 shows system synoptic 200 for the hydraulic system only; there are separate system synoptics for the electric and bleed air systems. The crew must integrate all the information sources to form an accurate mental model of the state of the airplane's main power systems, and more importantly, of the airplane's remaining capabilities. The task of integrating the diverse sources of detailed information to assess the state of the main airplane power systems and the airplane's remaining capabilities can be difficult using current methods, and may lead to crew errors. The combination of detailed and separate system indications and the integration and assessment task require flight crews to undergo extensive training, at great cost to airlines. Also, substantial amounts of display and panel space are dedicated to the separate, diverse, and detailed indications and controls. Display and panel space is expensive, and must be used efficiently because the power system indications must compete with other important flight deck functions for limited display space.

As system technology has evolved to current generation airplanes, the approach of displaying each system separately at the detailed component level using unintegrated indications, including control panel switch positions and lights, crew alert messages, system synoptic displays, and checklists, has become less desirable for a number of reasons. For one, increasing levels of automation have made it possible, in many cases, for systems to be reconfigured without flight crew involvement. The systems could automatically reroute around the failed component to maintain system functionality when it is possible. Also, increasing levels of system complexity and system integration complexity have made it more difficult for a human operator to quickly ascertain how even a single failure affects overall system function. Conclusions of human factors research have emphasized the importance of providing flight crew with information about both physical component status and system overall function. What is most critical is that the flight crew is able to ensure successful operation of the aircraft by knowing the status of system functions and by being able to restore system functions in the event of failure.

As can be seen, there is a need for a more concise and more integrated display method for providing flight crews with information about the power systems, including the fuel, propulsion, electrical, hydraulic, and bleed air systems, on their aircraft. There is also a need for a display and control method for aircraft energy systems management that removes the burden on the flight crew to reason through a collection of individual component failures to determine the implications of the failures on overall system operation. Moreover, there is a need for a display method for providing flight crews with integrated information about aircraft power systems and a control method for aircraft energy systems management that provides an approach to prioritizing failures.

SUMMARY OF THE INVENTION

The present invention provides a more concise and more integrated display and control method for providing flight crews with information about aircraft power systems, including the fuel, propulsion, electrical, hydraulic, and bleed air systems. The present invention also provides a display and control method for aircraft energy systems management that removes the burden on the flight crew to reason through a collection of individual component failures to determine the implications of the failures on overall system operation. Moreover, the present invention provides a display method for providing flight crews with integrated information and indications about aircraft power systems and a control method for aircraft energy systems management that provides an approach to prioritizing failures.

In one aspect of the present invention, an energy systems management method, provides a hierarchically arranged, interrelated set of synoptic displays that incorporate controls on the displays. These synoptic displays interface with the controllers of the energy systems to: receive information from and provide command inputs to the energy system; acquire human inputs through the synoptic displays by means of a computer user interface device; and control the energy system by processing the human inputs through the synoptic displays to provide command inputs to the energy system.

In another aspect of the present invention, an energy systems management method provides a hierarchically arranged, interrelated set of synoptic displays that provide indications to the flight crew about individual energy systems as well as overall systems status. One synoptic display of the set of synoptic displays is an overall energy synoptic, and the other synoptic displays of the set of synoptic displays are synoptics displaying the status and configuration of the individual corresponding energy systems. The energy systems management method also provides a means to receive information from and provide command inputs to the energy system; acquire human inputs through the synoptic displays by means of a computer user interface device; and control the energy system by processing the human inputs through the synoptic displays to provide command inputs to the energy system, as described above.

In even another aspect of the present invention, an energy systems management method provides a hierarchically arranged, interrelated set of synoptic displays that provide indications to the flight crew about individual energy systems as well as overall systems status. One synoptic display of the set of synoptic displays is an overall energy synoptic, and the other synoptic displays of the set of synoptic displays are synoptics displaying the status and configuration of the individual corresponding energy systems. The overall synoptic display and corresponding energy systems synoptic displays include bubbles representing energy systems, text boxes representing the supporting system functions that the energy system supports, and arrows representing energy source and functional dependency interrelationships, with the bubbles, the text boxes, and the arrows arranged hierarchically. Each energy system has a corresponding synoptic display selectable from the overall energy synoptic by selecting, via a computer user interface, the corresponding bubble representing the energy system. Selecting a text box provides detailed information regarding system consequences and/or limitations due to loss of that system and accumulates the same information into a consequential checklist for later phases of flight. The synoptic displays employ a graphical means, such as combinations of symbol shapes and color, for representing whether each energy system is enabled and whether each energy source and functional dependency interrelationship is enabled. The method also includes steps of acquiring human inputs through the synoptic displays, displaying boxed messages where selecting a boxed message provides an appropriate command input to an energy system for producing corrective action; and controlling the energy system by processing the human inputs through the synoptic displays to provide command inputs to the energy system.

These and other features, aspects and advantages of the present invention will become better understood with reference to the following drawings, description, and claims.

DETAILED DESCRIPTION OF THE INVENTION

Figure 1A:
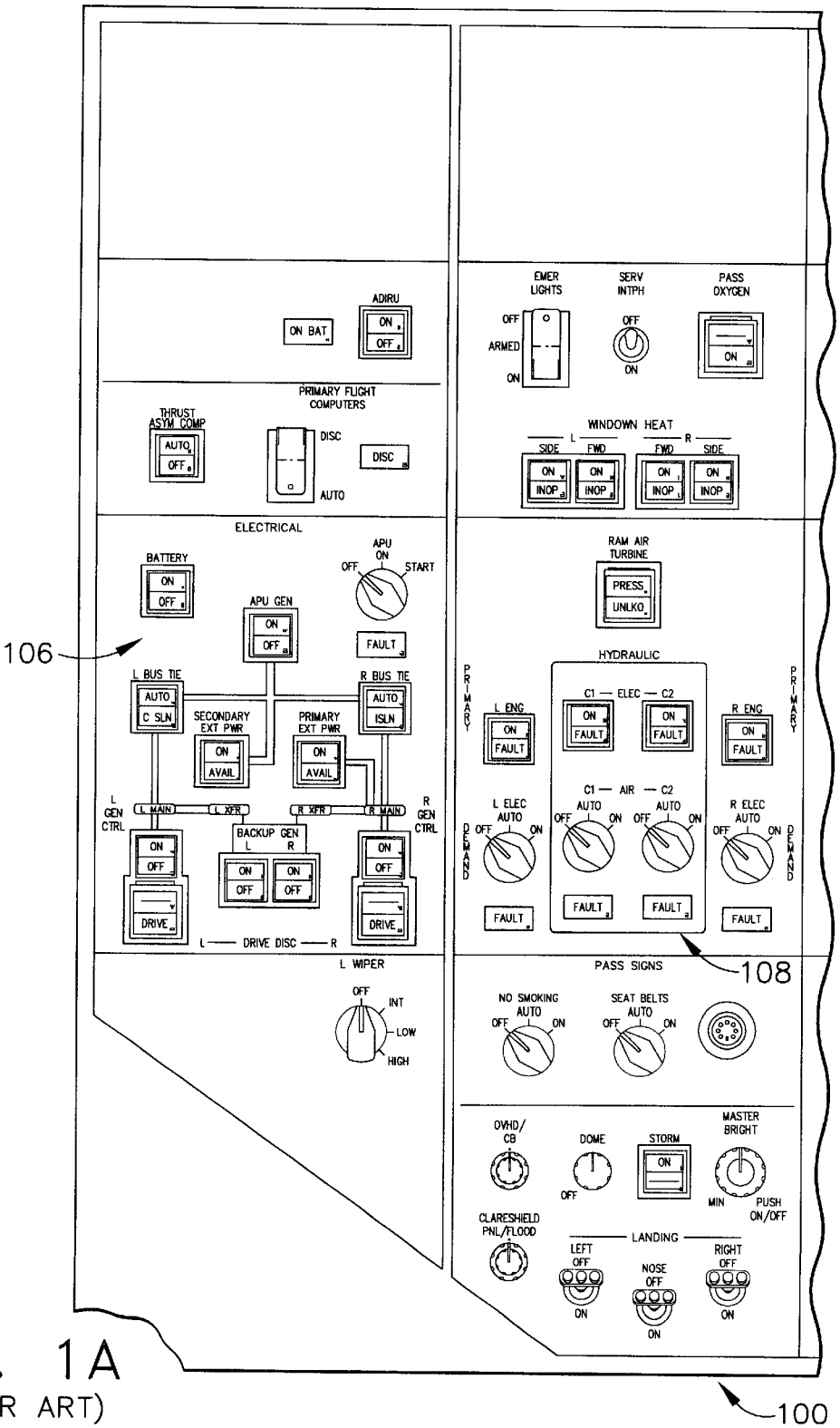
FIGS. 1A and 1B together provide a diagram illustrating an overhead panel instrument display similar to one currently in use in commercial aircraft.
Figure 1B:
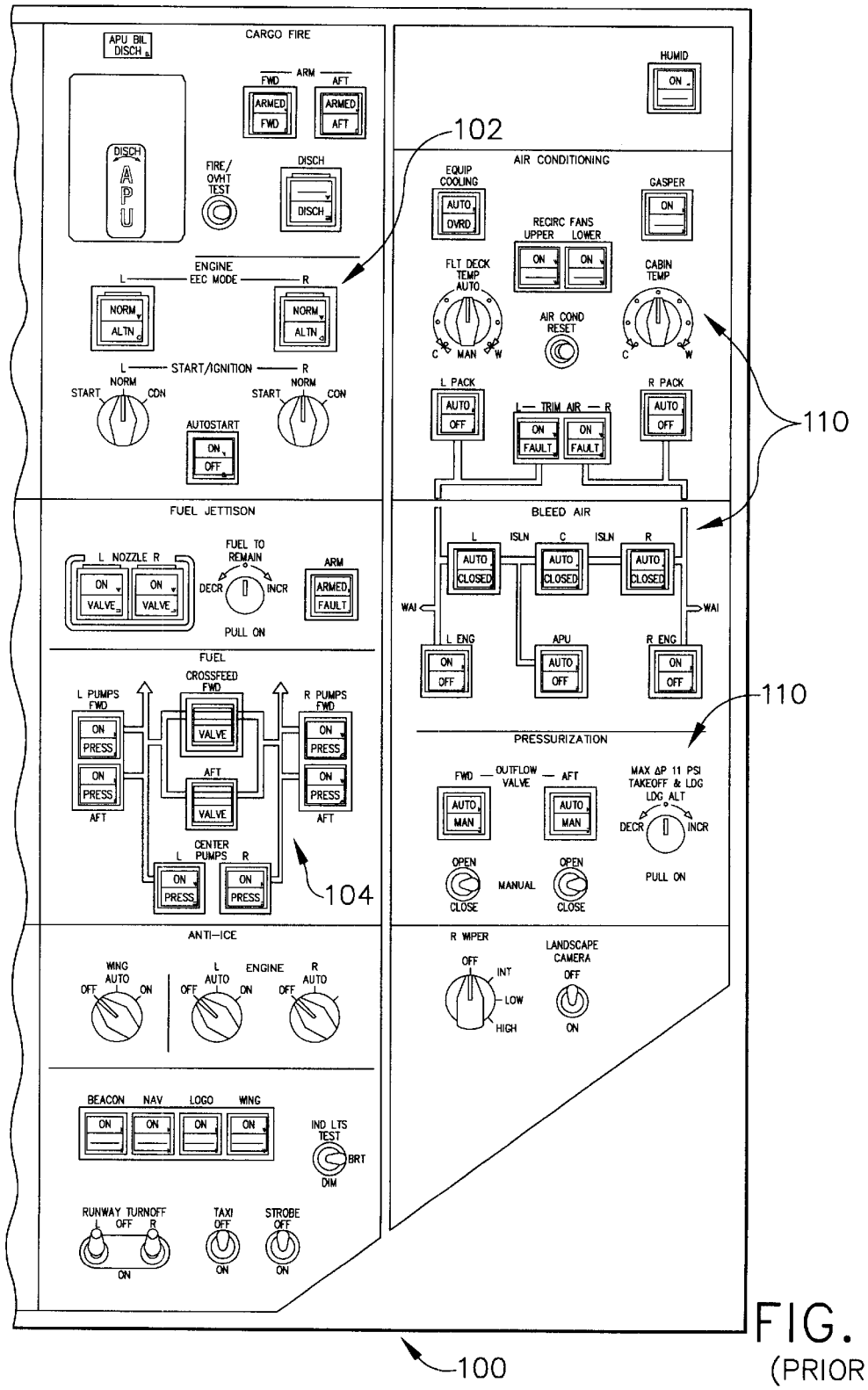
Figure 2:
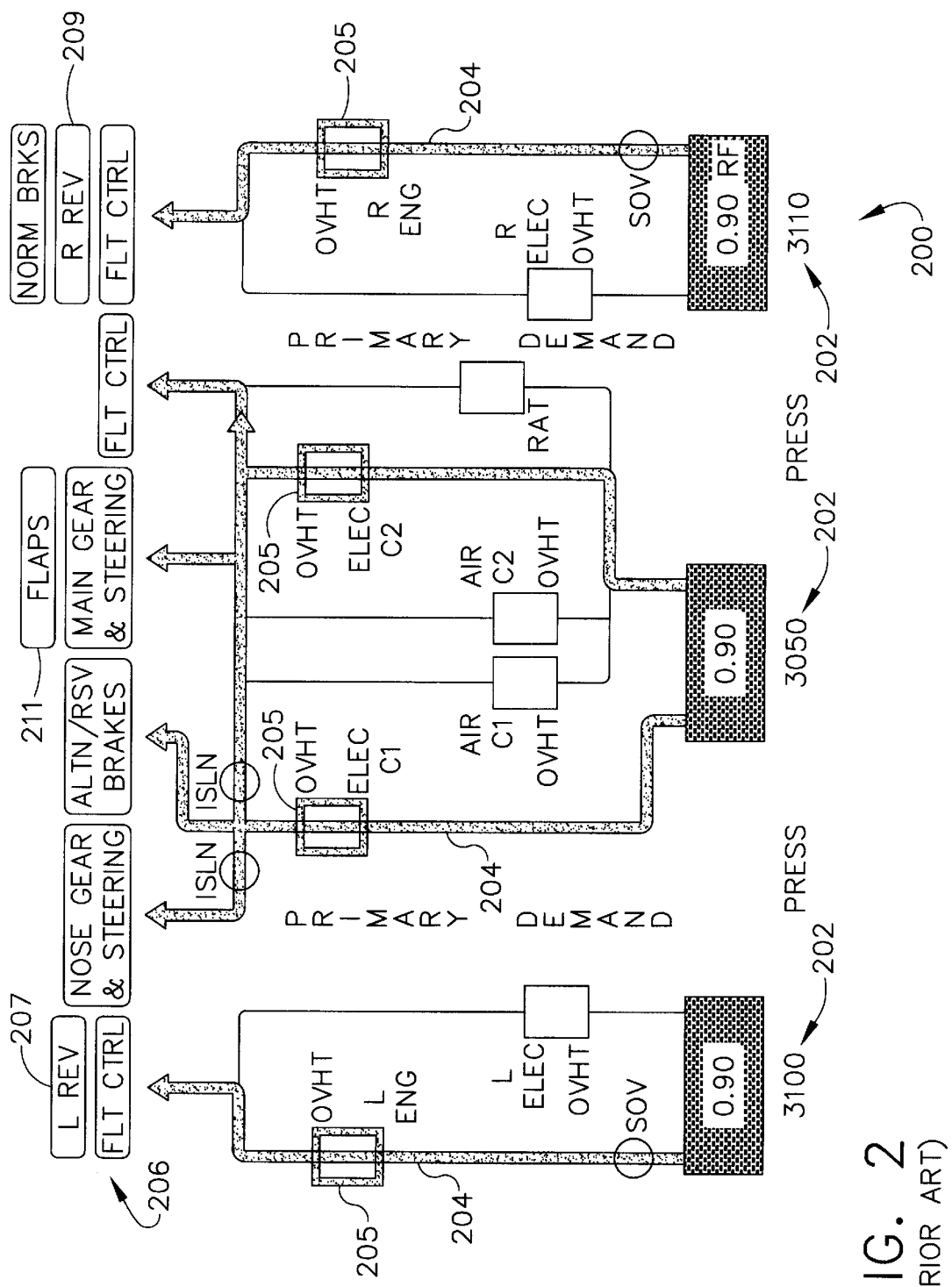
FIG. 2 is a diagram of a hydraulic synoptic display similar to one currently in use in commercial aircraft.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a more concise and more integrated display method for providing flight crews with information about the power systems, including the fuel, propulsion, electrical, hydraulic, and bleed air systems, on their aircraft. The display method enables the flight crew to ensure successful operation of the aircraft by knowing the status of system functions and by being able to restore system functions in the event of failure. The present invention provides a functional overview that organizes aircraft alarms and alerts in a functional framework that allows the flight crew to more effectively and efficiently manage aircraft systems, in contrast to prior art displays which provide alarms and alerts at the component level without the higher level context of a functional framework. The present invention creates functional status overviews that reveal whether key system functions are being achieved.

The present invention also provides a display and control method for aircraft energy systems management that removes the burden on the flight crew to reason through a collection of individual failures to determine the implications of the failures for system operation by summarizing and integrating component failures into a picture of which system functions are affected, unlike prior art systems which require the crew to integrate system information and determine the impact on system function.

Moreover, the present invention provides a display and control method for providing flight crews with information about aircraft power systems and method for aircraft energy systems management that provides an approach to prioritizing failures. The functional overview provided by the present invention allows the flight crew to see which functions are lost and how those failed functions affect other systems, in contrast to prior art systems, which provide information at a detailed component level with very little integration of information, rather than a functional overview.

The aircraft energy systems management method, according to one embodiment, is a high level energy systems management method which may have the following characteristics. (1) The flight crew manages energy availability rather than controlling components within an energy system. (2) The flight crew is able to maintain minimum involvement in energy management, for example, during startup, shutdown and energy configuration changes. (3) The flight crew is alerted only to mission function limitations and consequences due to energy losses, rather than component failures within an energy system. The aircraft energy systems management method, in accordance with one embodiment, may be display-based using a cursor control computer interface device, such as a track ball, a touch pad, a stick, or a touch screen. The aircraft energy systems management method and display may be interfaced to an aircraft's energy systems through bidirectional digital interfaces, as known in the art. Analog interfaces to an aircraft's energy systems may be controlled using remote data concentrators, also as known in the art. The energy systems management method and display of the present invention may also be adapted to and used for any machine with complex or redundant interrelated power systems, for example, ships, spacecraft, trains, or nuclear power plants.

Figure 3:
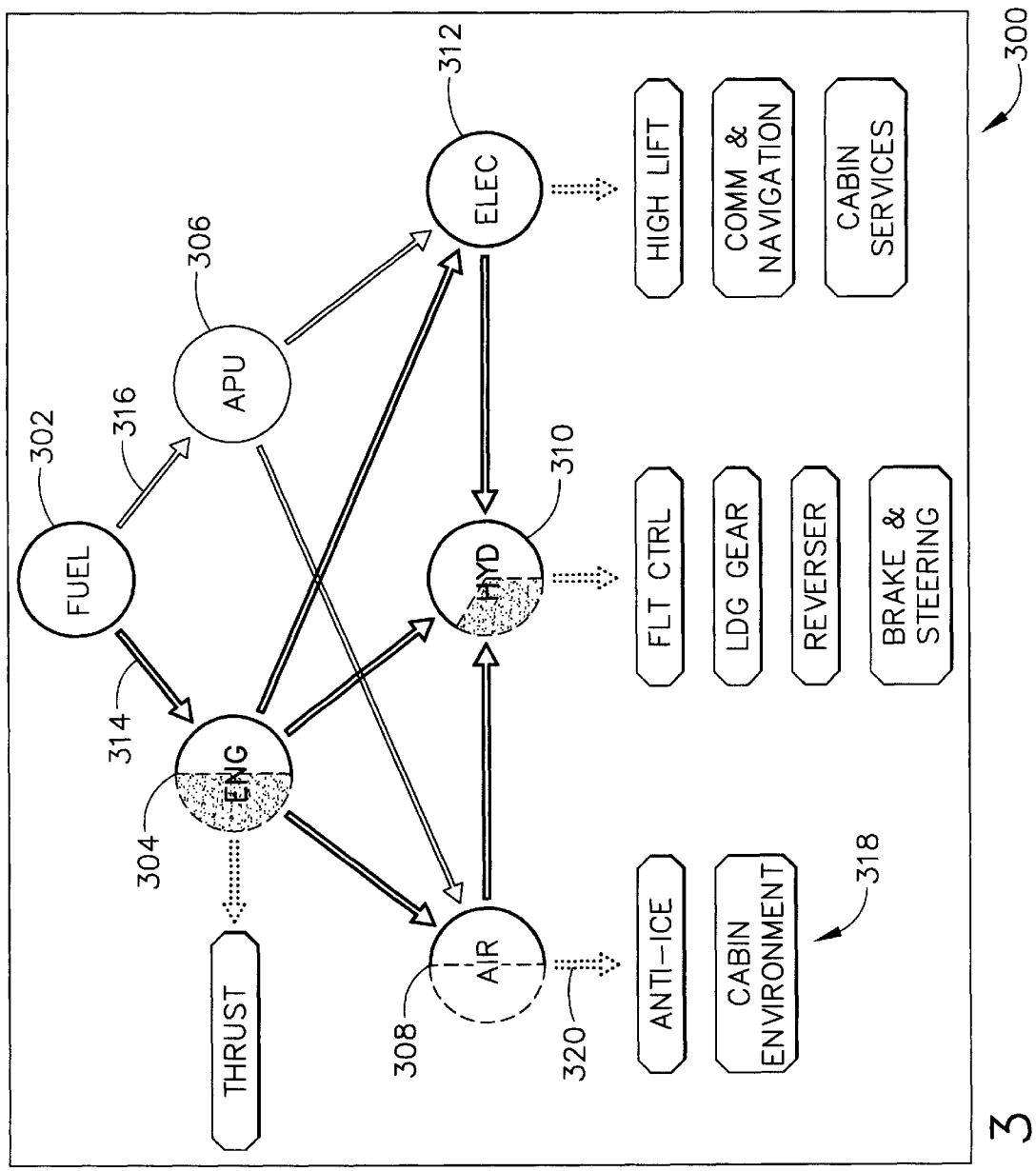
FIG. 3 is an overall energy synoptic display according to one embodiment of the present invention.

Referring now to FIG. 3, an overall airplane energy synoptic 300 is illustrated. Each bubble, which is illustrated in FIG. 3 as a circle, may represent a particular energy delivery or conversion system. Although FIGS. 3 through 7 represent each bubble as a circle, any other suitable graphical representation scheme could be used. For example, square shapes, different colors, or even text effects such as bold face or underlining could be used to represent a bubble. Combinations of graphical representations may also be used; for example, shape may be used with color to accommodate color blind pilots. Fuel bubble 302, for example, represents the fuel delivery system; engine bubble 304 represents the engines with the bubble divided into left and right portions to represent each of the left and right main engines, respectively; auxiliary power unit (APU) bubble 306 represents the APU; air bubble 308, also divided in two, represents right and left bleed air systems; hydraulic bubble 310, divided in three, represents left, center, and right hydraulic systems; and electrical bubble 312, also divided in two, represents right and left electrical systems. Arrows, such as arrow 314, represent energy interrelationships and functional dependencies of the system. For example, arrow 314, pointing from fuel bubble 302 to engine bubble 304, represents that the fuel delivery system represented by fuel bubble 302 is a source of energy for the main engines represented by engine bubble 304. Likewise, arrow 316, directed from fuel bubble 302 to APU bubble 306, represents that the fuel delivery system represented by fuel bubble 302 is a source of energy for the APU represented by APU bubble 306. In the present example used to illustrate one embodiment, the bubbles in the display of overall airplane energy synoptic 300 are arranged hierarchically with the sources of energy generally being higher up in the display, and energy sinks and supporting systems being lower down in the display. Other hierarchical arrangements may be used, however, such as bottom to top or right to left, or any other suitable graphical indication of hierarchy, such as colors and shapes.

Thus, overall airplane energy synoptic 300, may illustrate all sources of the various types of energy systems hierarchically, beginning from the highest level to the lowest level, as well as the various redundant or alternate sources of energy available to each energy system. The hierarchy can then be used to point out the primary source of an energy loss, whereas all subsequent lower priority losses are consequential in nature. Restoring the higher level source would then automatically restore the consequential loss. In the event the highest level source cannot be restored, an alternate source may be selected to restore the consequential loss. In the present example used to illustrate one embodiment, when all systems are running normally, each bubble is represented by a circle that is green in color, providing at a glance indication that all systems are operating normally. The color green is generally indicated in FIGS. 4 through 7 by solid heavy weight lines. Thus, in FIG. 3 for example, the solid heavy weight lines of fuel bubble 302, arrow 314, and the right half of engine bubble 304, indicate that they are green. In other embodiments, other colors and shapes may be used to provide such indications. Further, references to specific colors and shapes in the present application provide only one example of a color scheme and shape scheme, as part of an overall graphical indication scheme, that is used as an example to illustrate one embodiment.

The APU, when running, may also be used as an energy source for air and electrical systems. Those interrelationships are depicted in overall airplane energy synoptic 300 by APU bubble 306, air bubble 308 and electrical bubble 312, and arrows directed from APU bubble 306 to air bubble 308 and electrical bubble 312. The APU may be depicted as off by APU bubble 306 having a white color when normally shut down. The color white is generally indicated in FIGS. 4 through 7 by solid light weight lines, such as the solid light weight lines of APU bubble 306 and arrow 316. The rectangular boxes containing text, for example, text boxes 318, may be cyan colored and indicate the general supporting system functions each energy bubble provides for the airplane mission. For example, text boxes 318 containing text "ANTI-ICE" and "CABIN ENVIRONMENT" along with arrow 320 directed from air bubble 308 to text boxes 318 indicate that the bleed air system provides the supporting system functions of anti-icing and cabin environment control for the airplane mission. In other words, arrow 320 indicates a functional dependency of supporting functions anti-icing and cabin environment control represented by text boxes 318 on bleed air system represented by air bubble 308.

The particular graphical configuration depicted in overall airplane energy synoptic 300 seen in FIG. 3, which would be augmented by color in an actual display, represents two failures in the aircraft energy system. The two failures, given to provide an illustrative example, are left engine loss and an internal failure within the left hydraulic system. At the highest source, the left engine has flamed out or has been shutdown due to an engine failure and the left half of engine bubble 304 (representing the left engine of a two engine airplane) would be colored a solid amber, indicating the loss of energy at the highest source. The color amber is generally indicated in FIGS. 4 through 7 either by shading or dashed lines, such as the shaded left half of engine bubble 304 and dashed lines of the left half of engine bubble 304 and the left half of air bubble 308. The consequences at the lower dependent sources are reflected for air and hydraulic as follows. The left half of the outline of air bubble 308 (representing the left system of a left and right isolated system) would be amber (dashed line) in color as a consequence of bleed loss from the left engine. Switchover to the right system is not automatic. The one third of hydraulic bubble 310 (representing the left system of a left, center, and right isolated system) would be a solid amber pie (shaded) due to a dual failure, one being the loss of left engine mechanical energy, and the other an internal failure within the left hydraulic system, for example, demand pump failing to switch on automatically. Note that the entire electrical bubble 312 would still be green (heavy solid line), although the left engine mechanical drive to the electrical generator is lost. This is due to the system design in which the left electrical busses are tied in with the right electrical system, resulting in no loss of electrical energy.

If the engine had flamed out, restarting the engine, which is the highest level energy source, would restore all lower dependant energy systems to normal. If the engine was intentionally shut down, the corrective action would then have to be taken at the next lower level.

Figure 4:
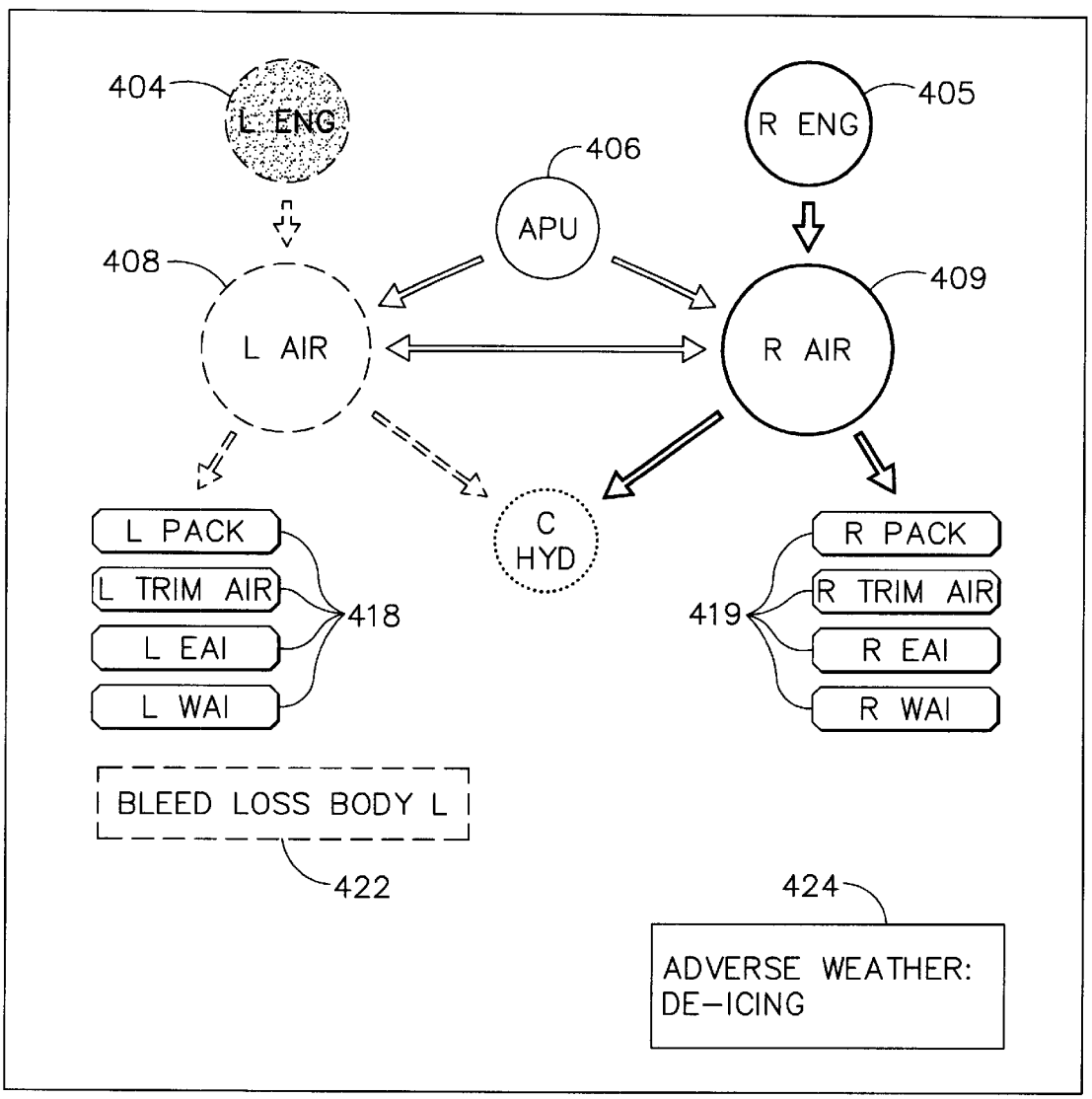
FIG. 4 is an air synoptic display according to one embodiment of the present invention.

Referring now to FIG. 4, a more detailed synoptic display, air synoptic 400 is illustrated. Selecting air bubble 308 on overall airplane energy synoptic 300 with the cursor control device would display air synoptic 400 shown in FIG. 4. Air synoptic 400 reflects a dual system that is currently isolated. Above each air bubble 408 and 409, the specific energy sources are indicated, such as the left engine represented by engine bubble 404, which, continuing with the present example, has failed, the right engine represented by engine bubble 405 and the APU represented by APU bubble 406, which, continuing with the present example, is an available source but is not operating, as indicated by white APU bubble 406 (solid light weight line). Below each air bubble 408, 409 are indicated the specific supporting system functions, by text boxes 418, 419, that are users of each energy source, respectively, in other systems. Left air bubble 408 would have an amber outline (dashed line) because of bleed air loss from its engine without any internal failure in its own system. Below the left air bubble is a boxed amber (dashed line) message 422: "BLEED LOSS BODY L", which would pop-up upon bleed loss. Selecting, or clicking on, message 422 with the cursor control device, would send a digital command to the air system to open the isolation valves to restore air from the right system. The supporting system functions, represented by text boxes 418, that are restored would have their boxed outlines change from amber to green. Selecting this single message 422 replaces the current detailed electronic checklist provided today. White colored (solid light weight line) boxed messages, for example, message 424, are intended for normal procedures, so when selected would command the system to its appropriate configuration.

Figure 5:
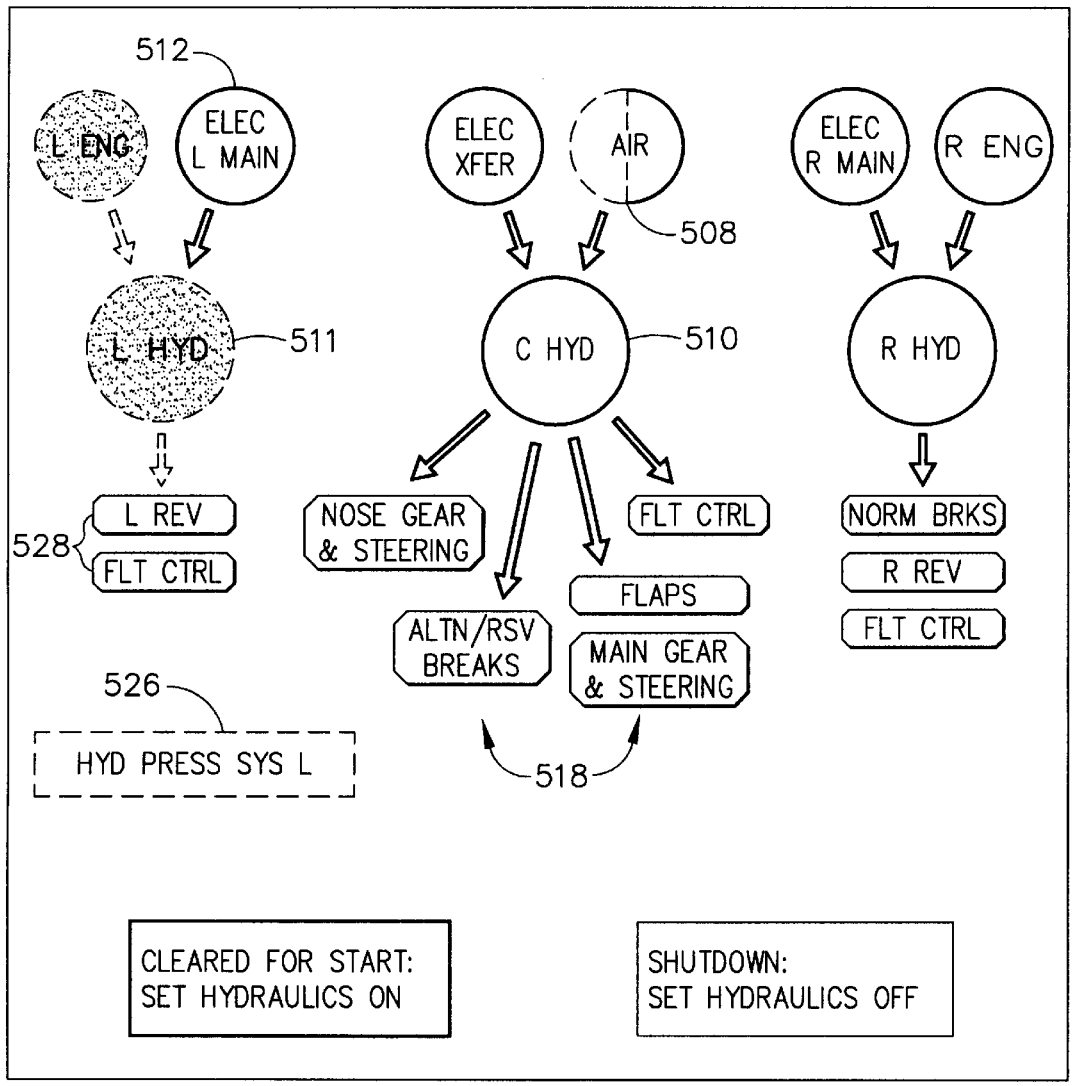
FIG. 5 is a hydraulic synoptic display according to one embodiment of the present invention.

Referring now to FIG. 5, the more detailed hydraulic synoptic display, hydraulic synoptic 500 is shown. Selecting hydraulic bubble 310 on overall airplane energy synoptic 300 with the cursor control device would display hydraulic synoptic 500 shown in FIG. 5. Hydraulic synoptic 500 reflects a triple hydraulic system. The center hydraulic system, represented by hydraulic bubble 510, indicates loss of the left air system, represented by the left half of the outline of air bubble 508 (representing the left system of a left and right isolated system) being amber (dashed line) in color as a consequence of bleed loss from the left engine. There is no loss of center hydraulic pressure to any of its dependant supporting system functions, represented by text boxes 518, due to the redundancy in the center hydraulic system. For the left hydraulic system, represented by hydraulic bubble 511, the left engine source has failed; and the secondary or redundant electrical energy source, represented by electrical bubble 512, is still available, which would be represented by electrical bubble 512 being green (heavy solid line); yet the left hydraulic system energy is lost due to an internal failure, which would be represented by hydraulic bubble 511 being solid amber (shaded) and not merely amber outline. Selecting the amber boxed message 526: "HYD PRESS SYS L", which would pop-up upon loss of hydraulic pressure, below hydraulic bubble 511, would command the system to turn on the demand pump, bypassing the automatic controls that have probably failed. If the demand pump has not failed, then hydraulics would be restored, otherwise the listed supporting system functionality, represented by text boxes 528—left thrust reverser and flight controls—is affected. More details could be provided by selecting text boxes 528, and accumulated into the consequential checklist for later flight phases.

Figure 6:
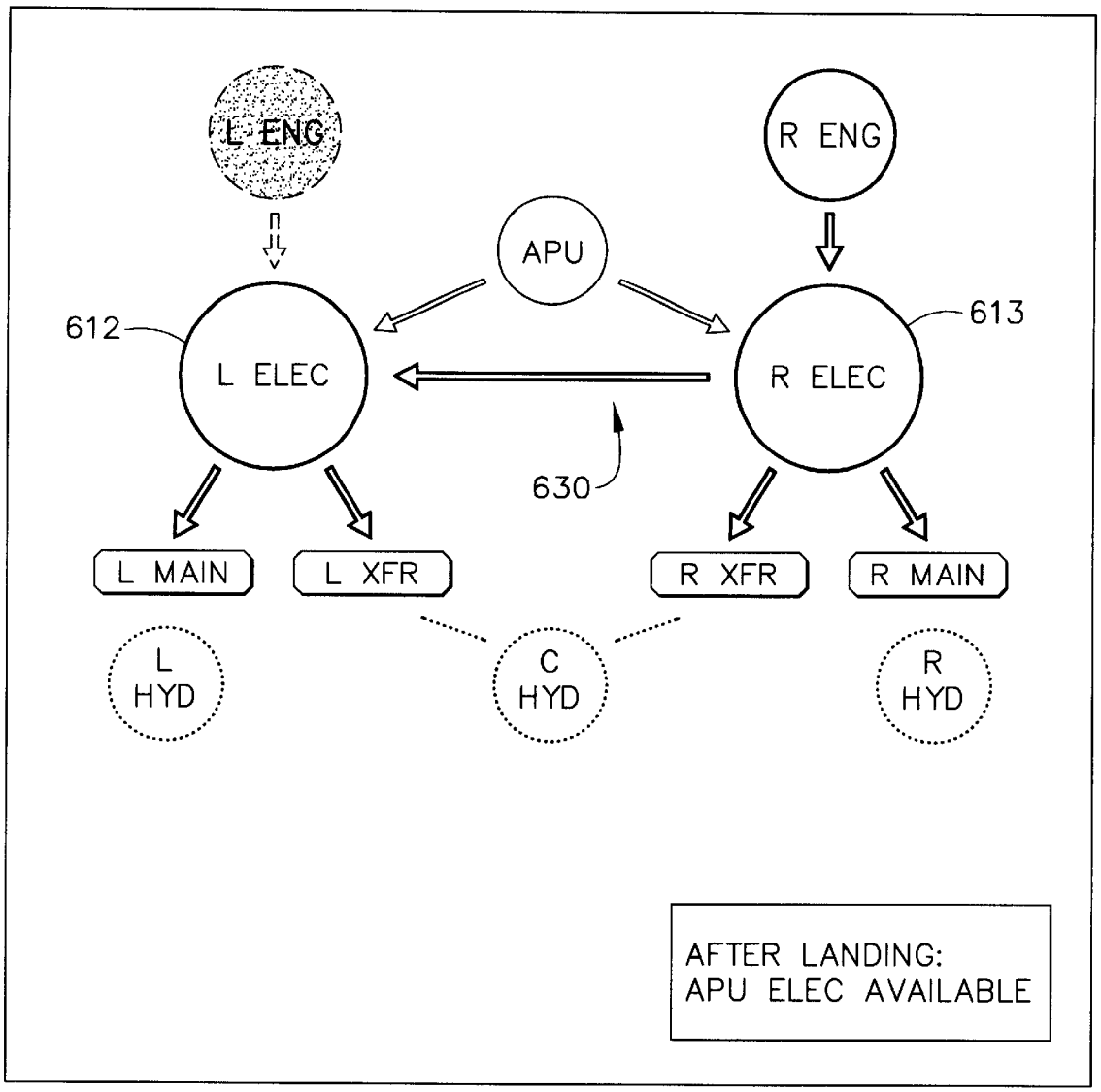
FIG. 6 is an electrical synoptic display according to one embodiment of the present invention.

Referring now to FIG. 6, the more detailed electrical synoptic 600 is shown. Selecting electrical bubble 312 on overall airplane energy synoptic 300 with the cursor control device would display electrical synoptic 600 shown in FIG. 6. Electrical synoptic 600, shown in FIG. 6, indicates energy flow, represented by left directed arrow 630, to the left system, represented by electrical bubble 612, from the right system, represented by electrical bubble 613. Left directed arrow 630 would be green (solid heavy weight line) to indicate that the energy flow is enabled. The energy flow to the left system from the right, continuing with the present example, would be due to automatic switching that would have occurred when the left engine mechanical source was lost.

Figure 7:
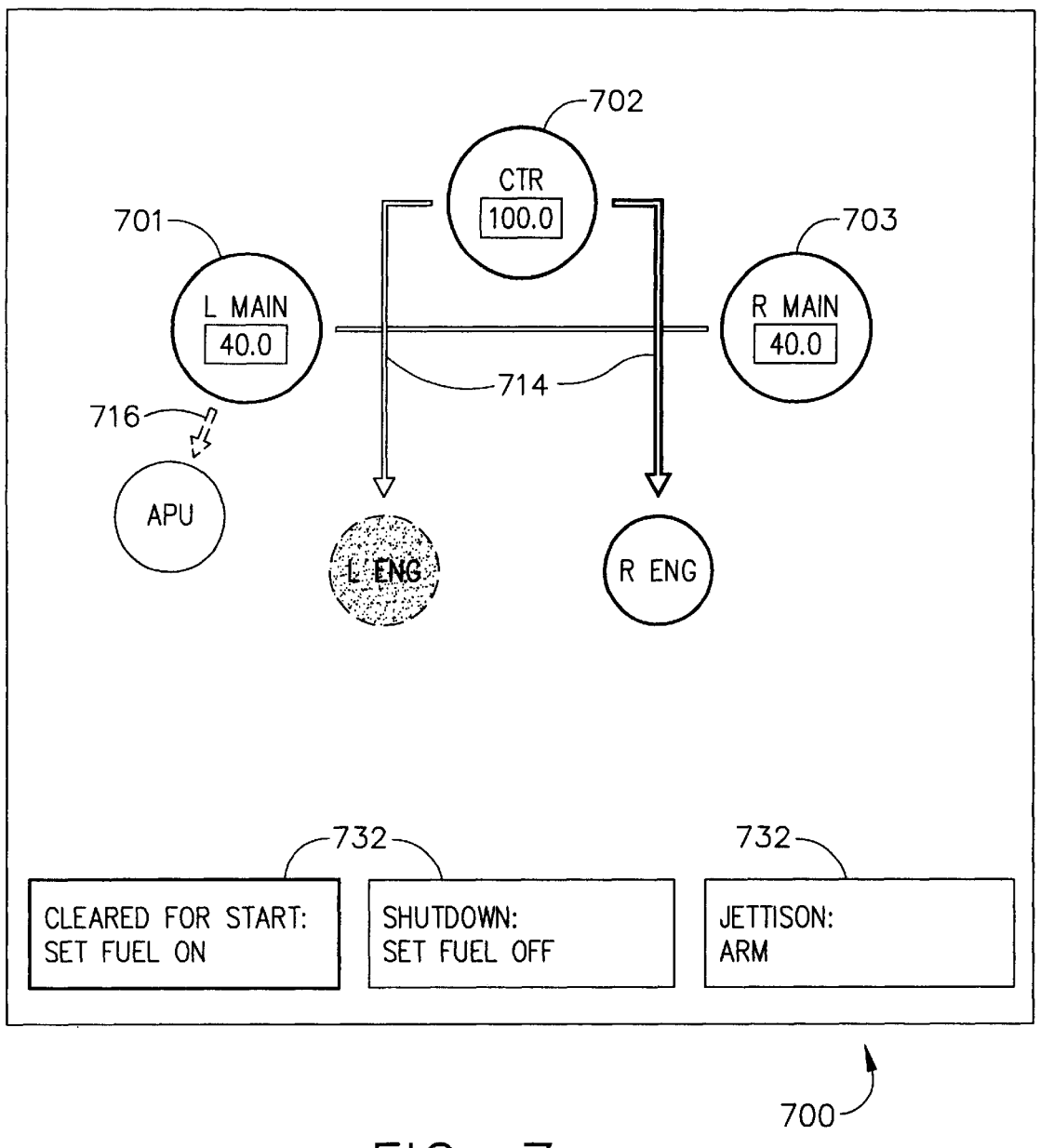
FIG. 7 is a fuel synoptic display according to one embodiment of the present invention.

Referring now to FIG. 7, the more detailed fuel synoptic 700 is shown. Selecting fuel bubble 302 on overall airplane energy synoptic 300 with the cursor control device would display fuel synoptic 700 shown in FIG. 7. The energy bubbles of fuel synoptic 700, fuel bubbles 701, 702, and 703, would be green (solid heavy weight line) indicating that its energy transfer capabilities, i.e. pumps, are operational. Note that the isolation valves between the left and right tanks are not reflected on the synoptic shown in FIG. 7, but all the possible flow paths from the fuel tanks to the engines and APU are depicted, for example, by arrows 714 and 716. When the system detects fuel imbalance between the wing tanks, a crew alert and amber colored boxed message would pop up, similar to one of messages 732, and selecting it would configure the pumps and valves appropriately to rebalance fuel. The white (solid light weight line) boxed messages 732 are intended for normal procedures, so when selected, would command the system to an appropriate configuration.

The present invention provides a system energy management method in which energy systems knowledge from a component level control and indication is elevated to an energy flow hierarchy and configuration system. The hierarchy and functional dependency of the various energy systems is portrayed defining the priority order in which corrective action is to be taken. The understanding of the system becomes intuitive, and numerous component controls are replaced with a minimum set of configuration controls. The status and configuration can be assessed at a glance. The crew workload is reduced, with greater emphasis on the mission and less emphasis on the details of energy management.

The present invention advances the integration of complex airframe systems, and display and control of these systems to flight crews. The present invention provides a substantial advance in methods of systems display and control that provides cost savings due to weight savings, hardware overhead control panel and panel space reduction, reduced crew training costs, and cross-model commonality.

Reduced crew training and reduced operating errors may be achieved due to (1) more meaningful integration of system failure indications facilitating faster action by the crew to restore critical functions, (2) better ability to see the implications of component losses and to determine how critical functions are affected, and (3) aiding the crew in thinking how to restore a function if primary equipment fails.

It should be understood, of course, that the foregoing relates to preferred embodiments of the invention and that modifications may be made without departing from the spirit and scope of the invention as set forth in the following claims.

We claim:

1. An energy systems management method comprising steps of:
   providing a hierarchically arranged, interrelated set of synoptic displays interfaced to an energy system for receiving information from and providing command inputs to said energy system, wherein said synoptic displays include a bubble representing said energy system and an arrow representing an energy source and functional dependence interrelationship, said bubble and said arrow arranged hierarchically;
   acquiring human inputs through said synoptic displays; and
   controlling said energy system by processing said human inputs through said synoptic displays to provide command inputs to said energy system.

2. The energy systems management method of claim 1 wherein one synoptic display of said set of synoptic displays is an overall energy synoptic displaying a bubble representing each energy system.

3. The energy systems management method of claim 2 wherein said energy system has a corresponding synoptic display selectable from said overall energy synoptic by selecting the corresponding bubble representing said energy system.

4. The energy systems management method of claim 1 wherein one synoptic display of said set of synoptic displays is a synoptic displaying the status of a corresponding energy system.

5. An energy systems management method comprising steps of:
   providing a hierarchically arranged, interrelated set of synoptic displays interfaced to an energy system for receiving information from and providing command inputs to said energy system, wherein said synoptic displays include a bubble representing said energy system, a text box representing a supporting system function, and an arrow representing an energy source and functional dependence interrelationship, said bubble, said text box, and said arrow arranged hierarchically;
   acquiring human inputs through said synoptic displays; and
   controlling said energy system by Processing said human inputs through said synoptic displays to provide command inputs to said energy system.

6. The energy systems management method of claim 5 wherein selecting said text box provides detailed information and accumulates said detailed information into a consequential checklist.

7. The energy systems management method of claim 5, further comprising a step of displaying boxed messages wherein selecting a boxed message provides an appropriate command input to an energy system for producing corrective action.

8. The energy systems management method of claim 5 wherein said synoptic displays utilize a color and shape graphical representation scheme for representing an enablement status of each energy system and an enablement status of each energy source and functional dependence interrelationship.

9. The energy systems management method of claim 5 wherein said synoptic displays utilize a shape graphical representation scheme for distinguishing energy systems from supporting system functions dependent on said energy systems.

10. The energy systems management method of claim 5 wherein said synoptic displays are interfaced to an aircraft's main power systems.

11. An energy systems management method comprising:
    providing a hierarchically arranged, interrelated set of synoptic displays interfaced to an energy system for receiving information from and providing command inputs to said energy system, wherein one synoptic display of said set of synoptic displays is an overall energy synoptic, and at least one synoptic display of said set of synoptic displays is a synoptic displaying the status of a corresponding energy system, wherein said synoptic displays include a bubble representing said energy system and an arrow representing an energy source and functional dependence interrelationship, said bubble and said arrow arranged hierarchically;
    acquiring human inputs through said synoptic displays; and
    controlling said energy system by processing said human inputs through said synoptic displays to provide command inputs to said energy system.

12. The energy systems management method of claim 11 further comprising a step of displaying boxed messages wherein selecting a boxed message provides an appropriate command input to an energy system for producing corrective action.

13. An energy systems management method comprising:
    providing a hierarchically arranged, interrelated set of synoptic displays interfaced to an energy system for receiving information from and providing command inputs to said energy system, wherein one synoptic display of said set of synoptic displays is an overall energy synoptic, and at least one synoptic display of said set of synoptic displays is a synoptic displaying the status of a corresponding energy system, wherein said synoptic displays include a bubble representing said energy system, a text box representing a supporting system function, and an arrow representing an energy source and functional dependence interrelationship, said bubble, said text box, and said arrow arranged hierarchically;
    acquiring human inputs through said synoptic displays; and
    controlling said energy system by processing said human inputs through said synoptic displays to provide command inputs to said energy system.

14. The energy systems management method of claim 13 wherein said energy system has a corresponding synoptic display selectable from said overall energy synoptic by selecting the corresponding bubble representing said energy system.

15. The energy systems management method of claim 13 wherein selecting said text box provides detailed information and accumulates said detailed information into a consequential checklist.

16. The energy systems management method of claim 13 wherein said synoptic displays utilize a color and shape graphical representation scheme for representing whether each energy system is enabled and whether each energy source and functional dependence interrelationship is enabled.

17. The energy systems management method of claim 13 wherein said synoptic displays distinguish energy systems from supporting system functions by representing energy systems with a bubble and supporting system functions with a text box.

18. The energy systems management method of claim 13 wherein said synoptic displays are interfaced to an aircraft's main power systems.

19. An energy systems management method comprising:

provliding a hierarchically arranged, interrelated set of synoptic displays interfaced to an energy system for receiving information from and providing command inputs to said energy system, wherein one synoptic display of said set of synoptic displays is an overall energy synoptic, wherein at least one synoptic display of said set of synoptic displays is a synoptic displaying the status of a corresponding energy system, wherein said synoptic displays include a bubble representing an energy system, a text box representing a supporting system function, and an arrow representing an energy source and functional dependence interrelationship, said bubble, said text box, and said arrow arranged hierarchically, wherein said energy system has a corresponding synoptic display selectable from said overall energy synoptic by selecting the corresponding bubble representing said energy system, wherein selecting said text box provides detailed information and accumulates said detailed information into a consequential checklist, and wherein said synoptic displays employ a graphical means for representing whether each energy system is enabled and whether each energy source and functional dependence interrelationship is enabled;

acquiring human inputs through said synoptic displays;

displaying boxed messages wherein selecting a boxed message provides an appropriate command input to an energy system for producing corrective action; and controlling said energy system by processing said human inputs through said synoptic displays to provide command inputs to said energy system.

\* \* \* \* \*